(12) United States Patent
Adams

(10) Patent No.: US 9,270,116 B2
(45) Date of Patent: Feb. 23, 2016

(54) SMART OUTLET

(75) Inventor: Tina M Adams, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 13/563,745

(22) Filed: Aug. 1, 2012

(65) Prior Publication Data

US 2014/0035368 A1 Feb. 6, 2014

(51) Int. Cl.
*H02J 3/14* (2006.01)

(52) U.S. Cl.
CPC .............. *H02J 3/14* (2013.01); *H02J 2003/143* (2013.01); *Y02B 70/3225* (2013.01); *Y04S 20/222* (2013.01); *Y10T 307/406* (2015.04)

(58) Field of Classification Search
CPC ..................... H02J 2003/143; H02J 2003/146; H02J 3/14; H02M 11/04; H04L 12/28; H03K 17/292
USPC ............................... 307/141, 31, 38; 340/310
See application file for complete search history.

(56) References Cited

U.S. PATENT DOCUMENTS

| | | | |
|---|---|---|---|
| 4,899,129 A * | 2/1990 | MacFadyen et al. | 340/12.32 |
| 6,828,695 B1 | 12/2004 | Hansen | |
| 6,980,079 B1 * | 12/2005 | Shintani et al. | 340/3.1 |
| 7,231,281 B2 | 6/2007 | Costa | |
| 7,576,448 B2 | 8/2009 | Goodrich | |
| 2008/0094210 A1 * | 4/2008 | Paradiso et al. | 340/540 |
| 2010/0127567 A1 | 5/2010 | Bisinella | |
| 2010/0145542 A1 | 6/2010 | Chapel et al. | |

OTHER PUBLICATIONS http://www.geappliances.com/home-energy-manager/, Home Energy Manager, Energy Monitor | GE Nucleus.
Tkacik, Daniel, "Electricity-monitoring technology surges forward at Carnegie Mellon", http://thetartan.org/2010/11/8/scitech/monitoring.

* cited by examiner

*Primary Examiner* — Jared Fureman
*Assistant Examiner* — Rafael Pacheco
(74) *Attorney, Agent, or Firm* — North Shore Patents, P.C.; Michele Liu Baillie

(57) ABSTRACT

A system for controlling energy usage includes: one or more configurable electrical outlet interfaces, where each given interface includes a switch configured in one of a plurality of positions corresponding to one of a plurality of energy usage modes; and a control panel displaying, for each given mode, configurable parameters to control energy usage of a device coupled to each interface configured with the given mode. Each given configurable electrical outlet interface comprises two states: a first state for allowing electrical current to flow through the given interface; and a second state for blocking the electrical current from flowing through the given interface. For each given mode determined to be "on", the control panel places each interface configured with the given mode in the first state. For each given mode determined to be "off", the control panel places each interface configured with the given mode in the second state.

6 Claims, 5 Drawing Sheets

SMART OUTLET

BACKGROUND

A typical home or building consumes electrical energy through a variety of devices. Some devices are to be on continuously, such as refrigerators, water heaters, and alarm system. Some devices can be on only during low cost hours, such as washer and dryers and dishwashers. Some devices are ambient devices, or devices that need not be on except during actual use, such as device chargers, lamps, and night lights. Controlling when these varying devices are on or off can be a part of any energy usage management or conservation effort. However, the control of energy usage is typically done on a grid level or at a main panel of a building. The occupants lack control of energy usage on a device-by-device basis.

SUMMARY

According to one embodiment of the present invention, a system comprises: one or more configurable electrical outlet interfaces, wherein each given configurable electrical outlet interface comprises a switch configured in one of a plurality of positions corresponding to one of a plurality of energy usage modes; and a control panel displaying, for each given energy usage mode, configurable parameters to control energy usage of a device coupled to each configurable electrical outlet interface configured with the given energy usage mode.

In one aspect of the present invention, each given configurable electrical outlet interface comprises two states: a first state for allowing electrical current to flow through the given configurable electrical outlet interface; and a second state for blocking the electrical current from flowing through the given configurable electrical outlet interface.

In one aspect of the present invention, the control panel comprises a network adapter for communicating with the one or more configurable electrical outlet interfaces.

In one aspect of the present invention, the control panel: for each given energy usage mode, determines whether the electrical current is to be "on" or "off" based on the configurable parameters associated with the given energy usage mode; and for each given energy usage mode determined for the electrical current to be "on", placing each configurable electrical outlet interface configured with the given energy usage mode in the first state.

In one aspect of the present invention, the control panel: for each given energy usage mode, determines whether the electrical current is to be "on" or "off" based on the configurable parameters associated with the given energy usage mode; and for each given energy usage mode determined for the electrical current to be "off", placing each configurable electrical outlet interface configured with the given energy usage mode in the second state.

According to one embodiment of the present invention, a method for controlling energy usage comprises: determining by a control panel an energy usage mode for each of a plurality of configurable electrical outlet interfaces, wherein each configurable electrical outlet interface comprises a switch configured in one of a plurality of positions corresponding to one of a plurality of energy usage modes; for each given energy usage mode, determining by the control panel configurable parameters associated with the given energy usage mode, the configurable parameters to control energy usage of each device coupled to each configurable electrical outlet interface configured with the given mode; and controlling by the control panel energy usage of each device coupled to each of the plurality of configurable electrical outlet interfaces according to the configurable parameters associated with each mode.

In one aspect of the present invention, the determining the energy usage mode for each of the plurality of configurable electrical outlet interfaces comprises: establishing communications with each of the plurality of configurable electrical outlet interfaces; determining the position of the switch at each of the plurality of configurable electrical outlet interfaces; and determining the energy usage mode for each of the plurality of configurable electrical outlet interfaces based on the position of the switch at each of the plurality of configurable electrical outlet interfaces.

In one aspect of the present invention, the determining the configurable parameters associated with the given energy usage mode comprises: receiving the configurable parameters for each given energy usage mode; associating the configurable parameters with each corresponding given energy usage mode; and storing each given energy usage mode associated with the corresponding configurable parameters.

In one aspect of the present invention, the controlling of the energy usage of each device coupled to each of the plurality of configurable electrical outlet interfaces according to the configurable parameters associated with each mode comprises: retrieving the configuration parameters associated with each given energy usage mode; and for each given energy usage mode, determining whether electrical current is to be "on" or "off" based on the configurable parameters associated with the given energy usage mode.

In one aspect of the present invention, the controlling of the energy usage of each device coupled to each of the plurality of configurable electrical outlet interfaces according to the configurable parameters associated with each mode further comprises: for each given energy usage mode determined to be "on", placing each configurable electrical outlet interface configured with the given energy usage mode in a state to allow the electrical current to flow through the configurable electrical outlet interface.

In one aspect of the present invention, the controlling of the energy usage of each device coupled to each of the plurality of configurable electrical outlet interfaces according to the configurable parameters associated with each mode further comprises: for each given energy usage mode determined to be "off", placing each configurable electrical outlet interface configured with the given energy usage mode in a state to block the electrical current from flowing through the configurable electrical outlet interface.

Computer program products corresponding to the above-summarized methods are also described and claimed herein.

DETAILED DESCRIPTION

Figure 1:
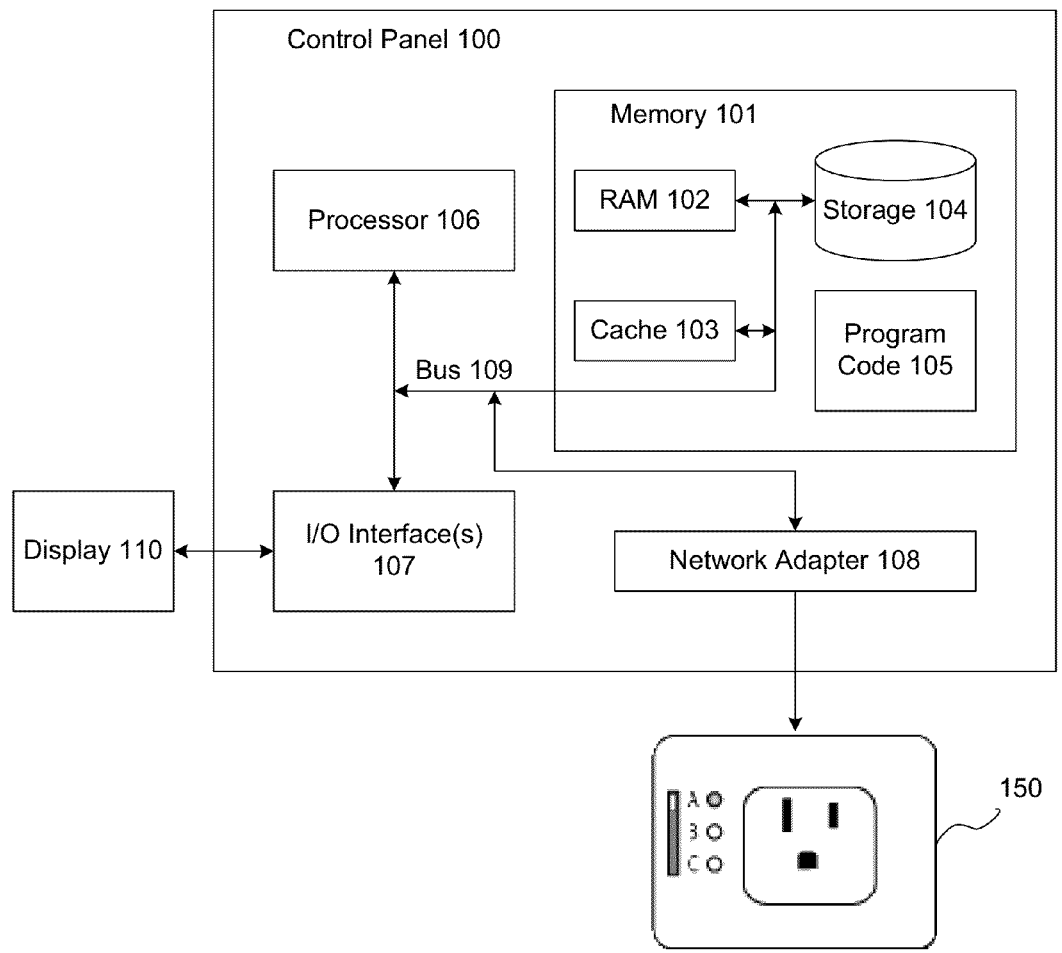
FIG. 1 illustrates an embodiment of a smart outlet system according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a smart outlet system according to the present invention. The system comprises a control panel 100 and a configurable electrical outlet interface 150. The control panel 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The control panel 100 may communicate with a display 110 via I/0 interfaces 107. The control panel 100 may also communicate with one or more configurable electrical outlet interfaces 150 via a network adapter 108. For example, the control panel 100 may communicate with the interfaces 150 via infrared, wireless, or other appropriate technology. The control panel 100 may be implemented as a stand-alone wall mounted or table top device, as a mobile application, or as an application executed on a personal computer, laptop, or workstation.

Figure 2A:
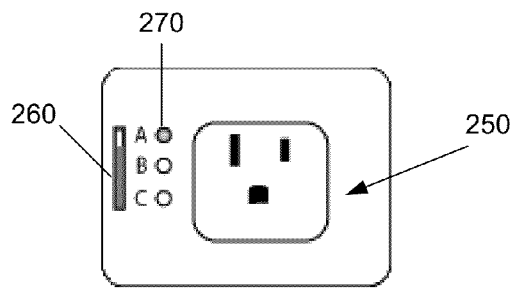
FIGS. 2A-2C illustrate embodiments of a configurable electrical outlet interface according to the present invention.
Figure 2B:
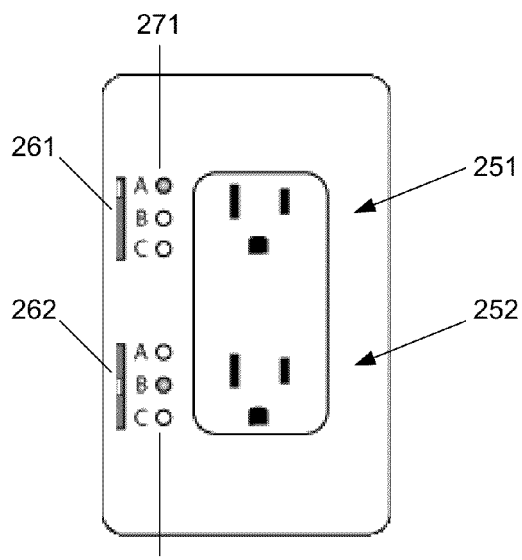
Figure 2C:
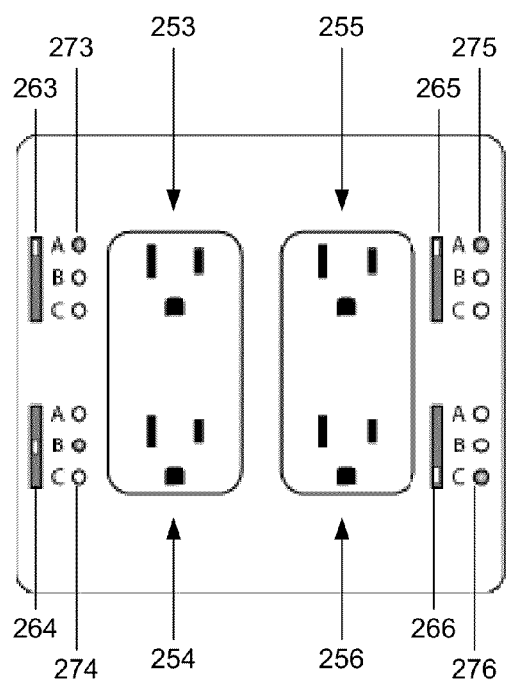

FIGS. 2A-2C illustrate embodiments of a configurable electrical outlet interface according to the present invention. FIG. 2A illustrates an embodiment comprising a single configurable electrical outlet interface 250; FIG. 2B illustrates an embodiment comprising two configurable electrical outlet interfaces 251-252; and FIG. 2C illustrates an embodiment comprising four configurable electrical outlet interfaces 253-256. The layouts shown in these embodiments are for illustrative purposes only. Other numbers or layouts of configurable electrical outlet interfaces are possible without departing from the spirit and scope of the present invention. Each configurable electrical outlet interface 250-256 is independently hardwired to an electrical outlet and acts as an interface between the electrical outlet and any device plugged into the electrical outlet.

Each interface 250-256 can be placed in one of two states by the control panel 100: a first state to allow electrical current to flow through the interface; and a second state to block electrical current from flowing through the interface. Each interface 250-256 functions independently from the others, i.e., each interface 250-256 allows or blocks electrical current independently of the other interfaces 250-256. Each interface 250-256 comprises a switch 260-266 with a plurality of positions corresponding to a plurality of energy usage modes. A user defines the mode for the device plugged into the electrical outlet by placing the switch in the corresponding position. The interfaces 250-256 may further comprise LED's 270-276 to indicate which mode is configured at a particular interface. In the illustrated embodiments, three modes are shown, however, any number of modes may be used. Once the modes are defined, the user has the ability, via the control panel 100, to turn on and off the devices based on one or more parameters associated with each mode, such as date and time of day. In this manner, energy usage is regulated by programming when certain modes of devices are on or off on an outlet-by-outlet (i.e., a device-by-device) basis.

For example, assume that three modes are defined: A (always on); B (on only during low costs hours in the evening); and C (ambient devices). Devices a user may wish to identify as Mode A include refrigerators, freezers, hot water heaters, fish tanks, alarm systems, and sprinkler systems. Mode B devices may include washers, dryers, and dishwashers, and Mode C devices may include device chargers, televisions, and night lights. Thus, for the outlet to which the refrigerator is plugged into, the user sets the switch 260 for the interface 250 coupled to this outlet to Mode A. For the outlet to which the dishwasher is plugged into, the user sets the switch 262 for the interface 252 coupled to this outlet to Mode B. For the outlet to which the night light is plugged into, the user sets the switch 266 for the interface 256 to Mode C. The appropriate LED would be illuminated to indicate the current mode of the respective interface.

Figure 3A:
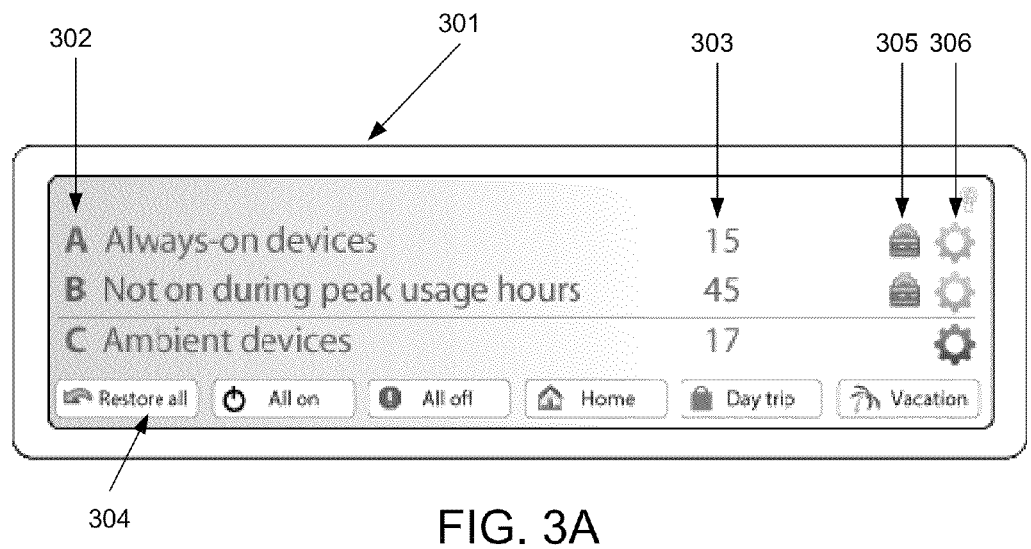
FIGS. 3A and 3B illustrate an embodiment of a display on the control panel according to the present invention.
Figure 3B:
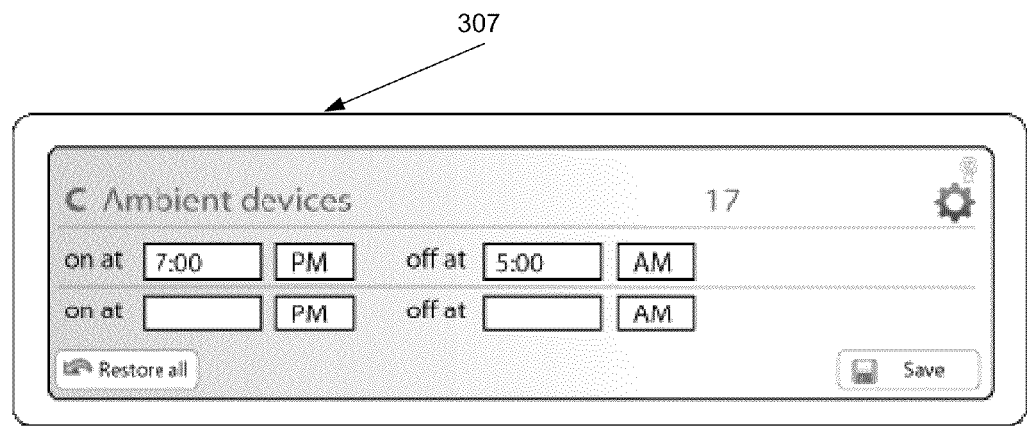

FIGS. 3A and 3B illustrate an embodiment of a display on the control panel according to the present invention. The control panel 100 displays, for each given energy usage mode, configurable parameters to control the energy usage of a device coupled to each configurable electrical outlet interface configured with the given energy usage mode. FIG. 3A illustrates an embodiment of a home screen on the display of the master panel. In this embodiment, the display comprises a touch screen 301, with the home screen showing the defined modes 302 and the number of devices configured for each mode 303. Quick buttons 304 may be provided to allow the user to quickly set the devices to predefined parameters. For example, the predefined 'Home' parameters would turn on Mode B devices, while turning off Mode C devices. The predefined 'Day trip' parameters would turn off Mode C devices, while turning on Mode B devices during off-peak usage hours and turning off these devices during peak usage hours. The predefined 'Vacation' parameters would turn off Mod B and Mode C devices regardless of time of day. The 'All on' parameters would turn on all devices regardless of mode, and the 'All off' parameters would turn off all devices regardless of mode. The 'Restore all' parameters would reset all devices to the default settings. One or more of the quick buttons may be user-defined.

Optionally, an ability to lock any of the modes may be provided. A password and numerical keypad (not shown) would display when a user tries to modify a locked mode or wants to lock down a mode. A lock icon 305 would be displayed next to a mode that has been locked. In this embodiment, the user would have to enter a password in order to select one of the quick buttons 304 that affect devices in the locked mode. The mode would need to be unlocked before a user can add or define new devices to the mode at the outlet level. For example, if outlet 1 is locked but outlet 2 and 3 are not, then any user may plug in and define outlets 2 or 3. For another example, if outlet 1 and 2 are locked while outlet 3 is unlocked, then the user may only define outlet 3.

To set the parameters associated with a particular mode, the user selects the settings icon 306 for that mode. Upon the selection of a settings icon 306, an edit screen is displayed on the control panel. FIG. 3B illustrates an embodiment of an edit screen according to the present invention. The edit screen 307 would display any number of parameters configurable by the user, such as Boolean time choices. Other parameters (not shown) may be configured by the user through the edit screen 307.

Figure 4:
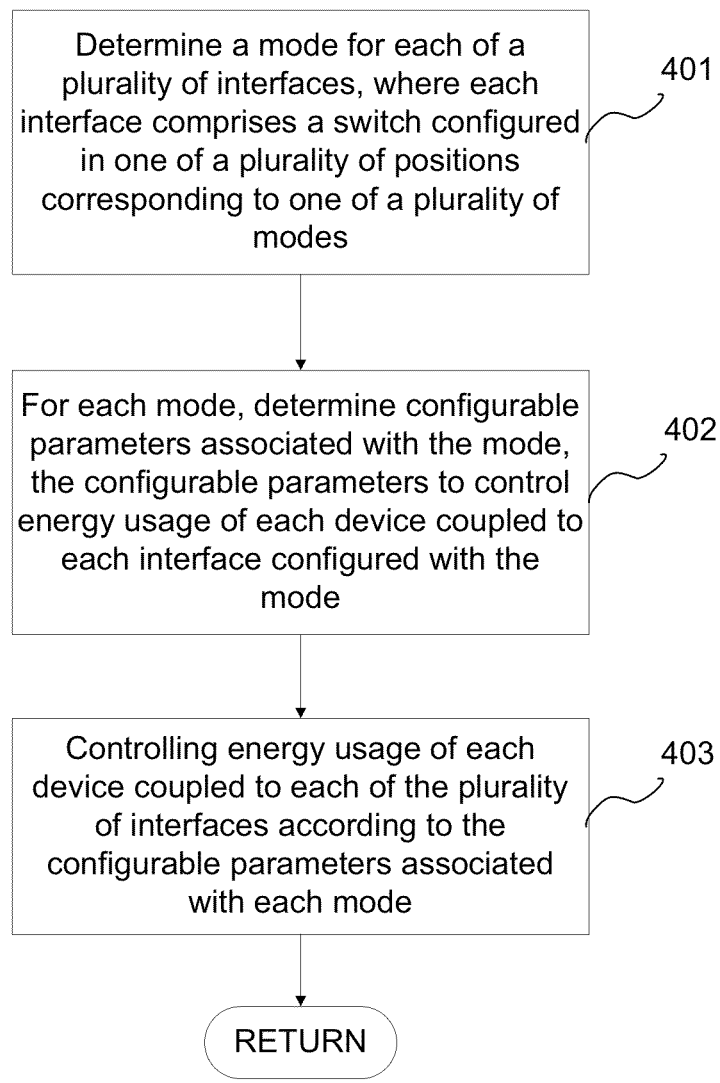
FIG. 4 is a flowchart illustrating an embodiment of a method for controlling energy usage using a smart outlet according to the present invention.

FIG. 4 is a flowchart illustrating an embodiment of a method for controlling energy usage using a smart outlet according to the present invention. In this embodiment, the method is implemented by the processor 106 of the control panel 100 executing the program code 105 stored in the memory 101. In the method, the control panel 100 determines a mode for each of a plurality of interfaces 250-256, where each interface 250-256 comprises a switch 260-266 configured in one of a plurality of positions corresponding to one of a plurality of modes (401). For each mode, the control panel 100 determines the configurable parameters associated with the mode, the configurable parameters to control energy usage of each device coupled to each interface 250-256 configured with the mode (402). The control panel 100 controls the energy usage of each device coupled to each of the plurality of interfaces 250-256 according to the configurable parameters associated with each mode (403).

Figure 5:
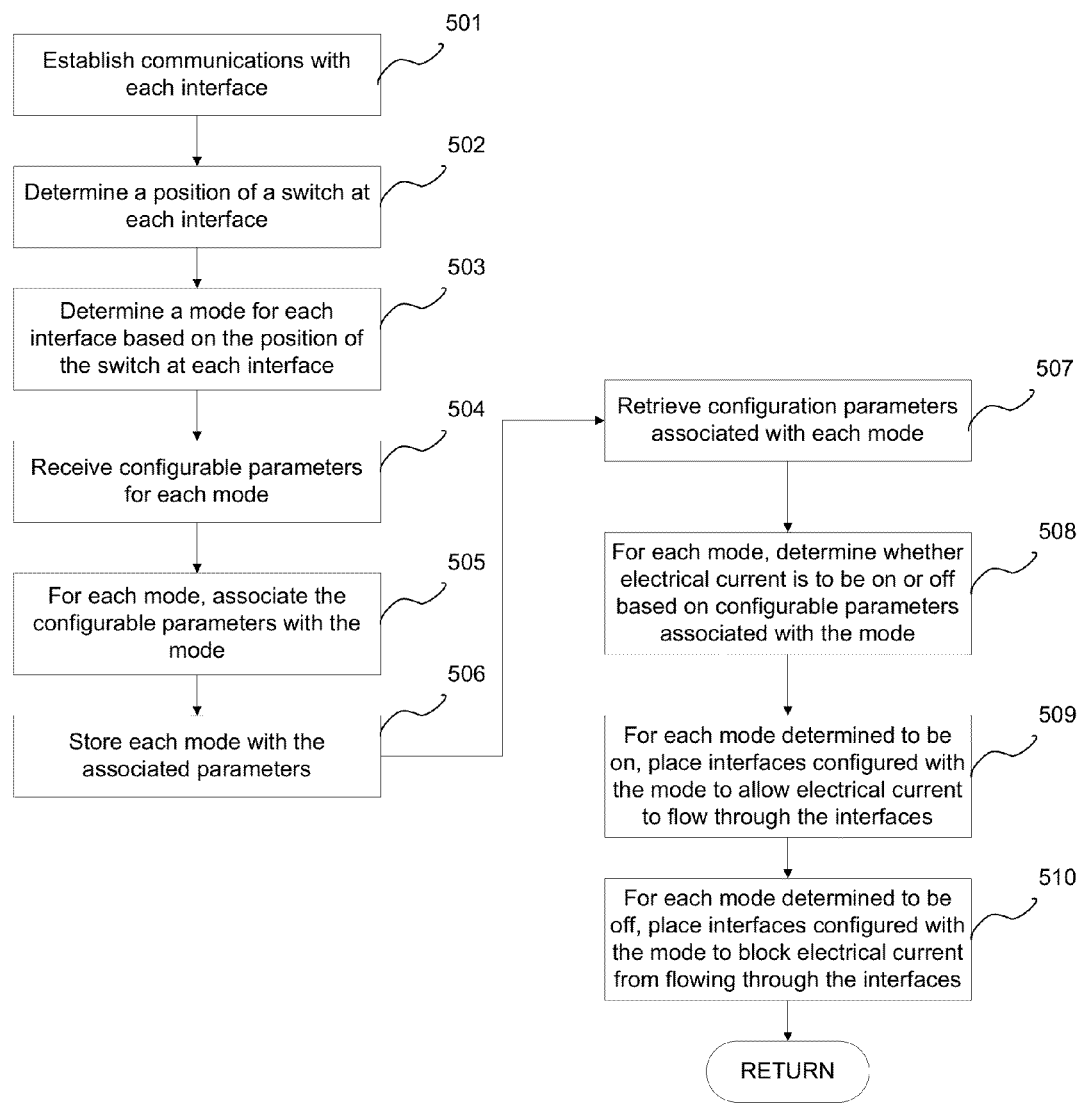
FIG. 5 is a flowchart illustrating in more detail the embodiment of the method for controlling energy usage using a smart outlet according to the present invention.

FIG. 5 is a flowchart illustrating in more detail the embodiment of the method for controlling energy usage using a smart outlet according to the present invention. In the method, the control panel 100 establishes communications with each interface 250-256 (501), and determines the position of the switch 260-266 at each interface 250-256 (502). The control panel 100 determines a mode of reach interface 250-256 based on the position of the switch 260-266 at each interface 250-256 (503). At some point, the control panel 100 receives configurable parameters for each mode (504). For each mode, the control panel 100 associates the configurable parameters with its mode (505) and stores each mode with the associated parameters (506). To control the energy usage of devices, the control panel 100 retrieves the configuration parameters associated with each mode (507). For each mode, the control panel 100 determines whether the electrical current is to be on or off based on the configurable parameters associated with the mode (508). For each mode determined to be on, the control panel 100 places the interfaces configured with the mode in a state to allow electrical current to flow through the interfaces (509). For each mode determined to be off, the control panel 100 places the interfaces configured with the mode in a state to block electrical current from flowing through the interfaces (510).

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
one or more configurable electrical outlet interfaces, wherein each given configurable electrical outlet interface comprises a given switch configured in a given position of a plurality of positions corresponding to a given energy usage mode of a plurality of energy usage modes,
wherein each energy usage mode is defined by configurable parameters, the configurable parameters defining when the given configurable outlet interface is to be placed in a first state or a second state, wherein the first state allows electrical current to flow through the given configurable electrical outlet interface and the second state blocks the electrical current from flowing through the given configurable electrical outlet interface; and
a control panel coupled to the one or more configurable electrical outlet interfaces,
wherein the control panel determines the given position of the given switch, determines the given energy usage mode corresponding to the given position, retrieves the configurable parameters defining the given energy usage mode, and places the given configurable electrical outlet interface in the first state or the second state based on the configurable parameters.

2. The system of claim 1, wherein the control panel comprises a network adapter for communicating with the one or more configurable electrical outlet interfaces.

3. A method for controlling energy usage, comprising:
determining, by a control panel for a given configurable electrical outlet interface of a plurality of configurable electrical outlet interfaces, a given position of a plurality of positions of a given switch, the given position corresponding to a given energy usage mode of a plurality of energy usage modes,
wherein each energy usage mode is defined by configurable parameters, the configurable parameters defining when a given configurable outlet is to be placed in a first state or a second state, wherein the first state allows electrical current to flow through the given configurable electrical outlet interface and the second state blocks the electrical current from flowing through the given configurable electrical outlet interface;
determining, by the control panel, the given energy usage mode corresponding to the given position;
retrieving, by the control panel, the configurable parameters defining the given energy usage mode; and
placing, by the control panel, the given configurable electrical outlet interface in the first state or the second state based on the configurable parameters.

4. The method of claim 3, further comprising:
receiving the configurable parameters for the given energy usage mode;
associating the configurable parameters with the given energy usage mode; and
storing the given energy usage mode associated with the configurable parameters.

5. A computer program product for controlling energy usage, the computer program product comprising:
a computer readable storage medium having computer readable program code embodied therewith, the program code executable by a processor to:
determine, for a given configurable electrical outlet interface of a plurality of configurable electrical outlet interfaces, a given position of a plurality of positions of a given switch, the given position corresponding to a given energy usage mode of a plurality of energy usage modes,
wherein each energy usage mode is defined by configurable parameters, the configurable parameters defining when a given configurable electrical outlet is to be placed in a first state or a second state, wherein the first state allows electrical current to flow through the given configurable electrical outlet interface and the second state blocks the electrical current from flowing through the given configurable electrical outlet interface;
determine the given energy usage mode corresponding to the given position;
retrieve the configurable parameters defining the given energy usage mode; and place the given configurable electrical outlet interface in the first state or the second state based on the configurable parameters.

6. The computer program product of claim 5, further executable by the processor to:
receive the configurable parameters for the given energy usage mode;
associate the configurable parameters with the given energy usage mode; and
store the given energy usage mode associated with the configurable parameters.

* * * * *